(12) United States Patent
Sicard

(10) Patent No.: US 9,998,004 B2
(45) Date of Patent: Jun. 12, 2018

(54) ACCURATE NON-ISOLATED HIGH VOLTAGE DC-DC FEEDBACK

(71) Applicant: NXP USA, Inc., Austin, TX (US)

(72) Inventor: Thierry Sicard, Auzeville tolosane (FR)

(73) Assignee: NXP USA, Inc., Austin, TX (US)

( * ) Notice: Subject to any disclaimer, the term of this patent is extended or adjusted under 35 U.S.C. 154(b) by 0 days. days.

(21) Appl. No.: 15/644,909

(22) Filed: Jul. 10, 2017

(65) Prior Publication Data

US 2018/0034365 A1   Feb. 1, 2018

(30) Foreign Application Priority Data

Jul. 26, 2016 (EP) ..................................... 16305967

(51) Int. Cl.
*H02M 3/156* (2006.01)
*H02M 1/08* (2006.01)
*H02M 1/00* (2006.01)

(52) U.S. Cl.
CPC ............. *H02M 3/156* (2013.01); *H02M 1/08* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 7,872,372 B1* | 1/2011 | Voo ....................... | G11B 19/247 307/52 |
| 9,882,482 B1* | 1/2018 | Hendry ................. | H02M 3/158 |
| 2005/0237109 A1* | 10/2005 | Laletin ..................... | H03F 1/34 330/84 |
| 2007/0024213 A1 | 2/2007 | Shteynberg et al. | |
| 2010/0060190 A1 | 3/2010 | Cheng | |
| 2014/0062319 A1 | 3/2014 | Huang et al. | |
| 2014/0070785 A1 | 3/2014 | Galloway | |

FOREIGN PATENT DOCUMENTS

| | | |
|---|---|---|
| EP | 0 467 681 A2 | 1/1992 |
| EP | 2533606 A1 | 12/2012 |
| EP | 2 444 817 B1 | 10/2013 |
| GB | 2497213 A | 6/2013 |
| WO | WO-2016/032579 A1 | 3/2016 |

* cited by examiner

*Primary Examiner* — Jeffrey Gblende

(57) ABSTRACT

A method and apparatus for regulating a non-isolated high voltage converter applies a PWM signal to a power transistor that couples an input voltage to a floating ground node to charge an inductor and generate an output voltage which is measured with a first floating comparator to disable the PWM signal upon detecting a high threshold output voltage, the first floating comparator having inputs connected across first and second resistive elements to measure a voltage across a feedback resistor connected in series with a diode between the output voltage and a neutral ground reference. Subsequently, the output voltage is measured with a second floating comparator to enable the PWM signal upon detecting a low threshold output voltage, where the second floating comparator has inputs connected across the first and second resistive elements to measure the feedback voltage across the feedback resistor.

15 Claims, 7 Drawing Sheets

ACCURATE NON-ISOLATED HIGH VOLTAGE DC-DC FEEDBACK

CROSS-REFERENCE TO RELATED APPLICATIONS

This application claims the priority under 35 U.S.C. § 119 of European patent application no. 16305967.8, filed Jul. 26, 2016 the contents of which are incorporated by reference herein.

BACKGROUND OF THE INVENTION

Field of the Invention

The invention relates generally to the field of semiconductor devices. In one aspect, the present invention relates to the design, control, and operation of a DC-DC converter having non-isolated input and output voltages.

Description of the Related Art

There are many applications which use non-isolated power supplies to furnish low output power required to run microcontrollers, motors, LED displays, automotive devices, relays, AC switches, and the like. Conventional power supply solutions employing DC-DC voltage converter topologies (e.g., buck or buck-boost converters) which use the output to regulate the converter performance may use expensive components (e.g., opto-coupler or transformer circuits) to feedback the DC-DC converter output voltage to a floating DC-DC voltage converter. While feedback solutions have been proposed which do not require expensive feedback components, such solutions often introduce error into the feedback signal and/or otherwise require additional components and circuitry which can also introduce expense and error in the output voltage feedback. For example, reference is now made to FIG. 1 which illustrates a circuit schematic diagram of a conventional non-isolated power supply 100 in which a smart power device 101 (e.g., STMicro VIPer12A) has an integrated PWM controller 102 and power transistor 103, and which is connected in a buck converter configuration using a first freewheeling rectifier diode D1 for referencing the neutral ground reference N to output ground GND. As illustrated in the power supply 100, the smart power device 101 receives an input high voltage $V_{IN}$ across the input capacitor C2 at the drain input, and generates and output voltage $V_{OUT}$ across the output capacitor C6 which is connected in parallel with the output zener diode $D_{Z1}$. The supply voltage for the smart power device 101 is obtained from the converter output by means of the feedback diode D6 and capacitor C3 to supply the Vdd pin. The output voltage regulation circuit consists of feedback zener diode $D_Z$, filter capacitor Cx, and compensation diode D8 which peak charges the feedback capacitor C4 during the freewheeling time when the freewheeling rectifier diode D1 is conducting. During this time, the source or reference to the smart power device 101 is one diode drop D1 below ground, so the compensation diode D8 is included in an attempt to compensate for the diode drop and make the Zener voltage the same as the output voltage $V_{OUT}$. However, the compensation diode arrangement of the first and second diodes D1, D8 can contribute error to the output voltage feedback. This error contribution is shown with the measurement voltage plot 104 wherein the output voltage $V_{OUT}$ (developed across the output zener diode $D_{Z1}$ with respect to the neutral ground reference N) and the output feedback voltage $V_{DZ}$ (developed across the feedback zener diode $D_Z$ with respect to the output ground GND) are only equal if the voltages $V_{D1}$, $V_{D8}$ across the first and second diodes D1, D8 are equal. However, since the first and second diodes D1, D8 do not have the same current (especially when the first freewheeling rectifier diode D1 has a large peak current), the voltage feedback can be corrupted by voltage mismatch between the first and second diodes D1, D8. As seen from the foregoing, the existing solutions for controlling a DC-DC voltage converter having non-isolated input and output voltages are extremely difficult at a practical level by virtue of introducing circuit component complexity and expense as well as feedback error.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

Figure 1:
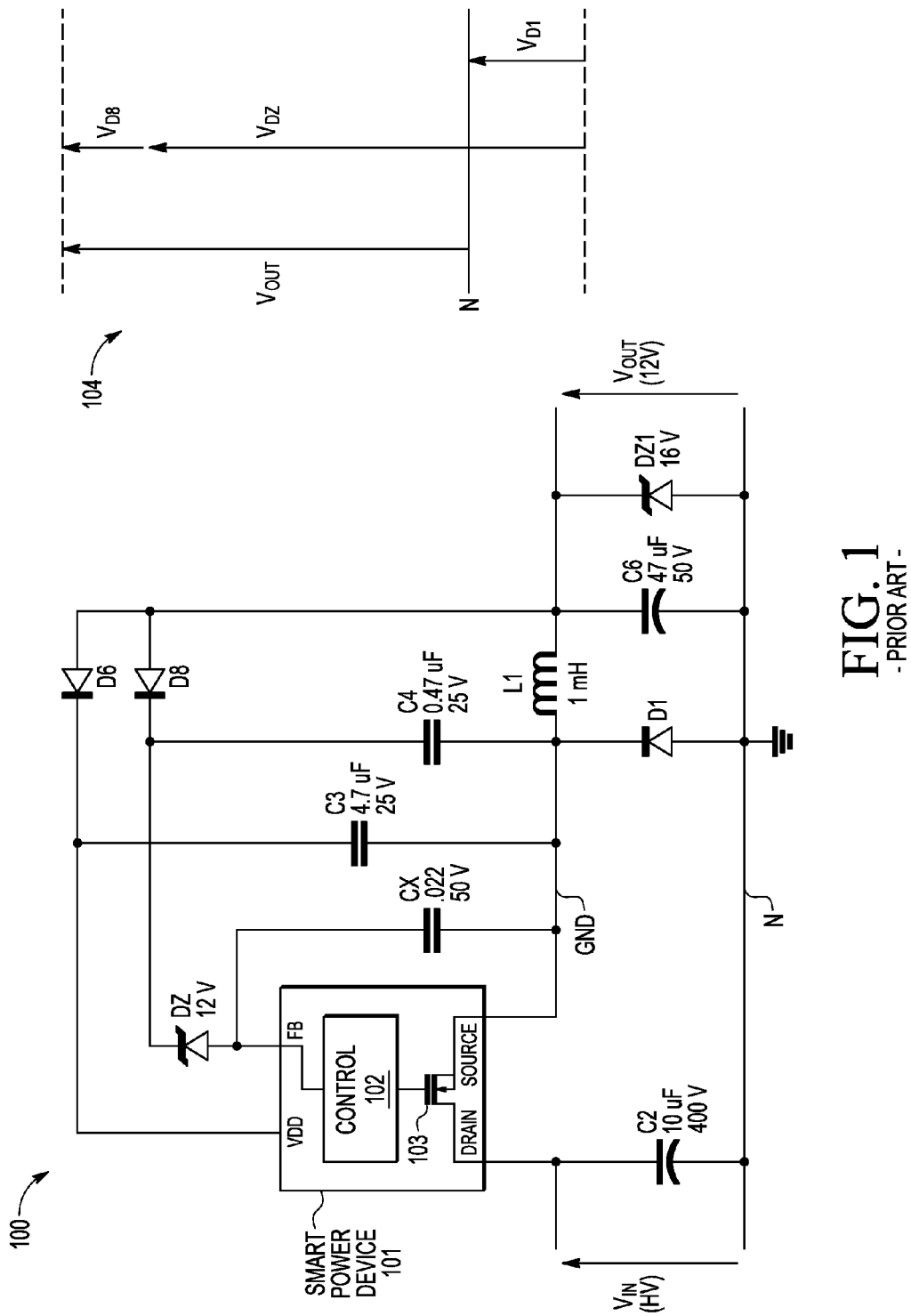
FIG. 1 is a schematic circuit diagram of a non-isolated power supply with a smart power device connected in a buck converter configuration.

A non-isolated high voltage DC-DC converter circuit and method are disclosed which use a pulse width modulator (PWM) circuit and power transistor to generate the converter output voltage across an output resistor (e.g., $R_1=10K\Omega$) and zener diode (e.g., $D_Z$) connected in series between the converter output and neutral ground reference (N). To prevent distortions caused by the freewheeling diode in the voltage feedback path, the disclosed converter provides output voltage regulation by including a feedback path with a pair of relatively large resistive elements (e.g., over 200 k$\Omega$) connected across the output resistor $R_1$ to generate high and low signals (SH, SL) which are fed back as inputs to a pair of upper and lower comparator drivers ($CMP_H$, $CMP_L$) in a floating converter driver. During commuting operations of the PWM circuit, the upper comparator driver $CMP_H$ in the floating converter reads the converter output voltage across the pair of relatively large resistive elements only when the driver ground (GND) is negative relative to the neutral ground reference (N) by a specified voltage (e.g., the voltage drop across the freewheeling diode). To this end, the upper comparator driver $CMP_H$ may include cascoded mirror circuits which are connected across the pair of relatively large resistive elements to force a 1V differential across the output resistor $R_1$, thereby providing an accurate output feedback voltage that is not affected by the negative driver ground or by interference from the freewheeling diode. Otherwise during commuting operations, when the driver ground (GND) is positive relative to the neutral ground reference (N), the PWM circuit increases the converter output voltage until such time as an upper output voltage threshold is reached, at which point the PWM circuit may stop commuting (e.g., skip cycles), allowing the converter output voltage to decrease as the output capacitor is linearly discharged by the load current. While the DC-DC converter is not commuting, the lower comparator driver $CMP_L$ in the floating converter driver is connected to detect when a lower output voltage threshold is reached. To this end, the lower comparator driver $CMP_L$ may include cascoded mirror circuits which are connected to receive the high and low signals (SH, SL) from each end of the output resistor $R_1$. However, when the floating converter driver is not commuting, the driver ground (GND) is at the output voltage (since there is no voltage across the inductor) so that the lower comparator driver $CMP_L$ is connected to detect when the lower output voltage threshold is reached, at which point the commuting operations are restarted. In accordance with the embodiments disclosed herein, the non-isolated high voltage DC-DC converter circuit and method of operation innovation utilize an efficient design with an efficient design, reduced component count, and lower cost while also providing accurate feedback of the exact voltage output from the DC-DC converter.

Figure 2:
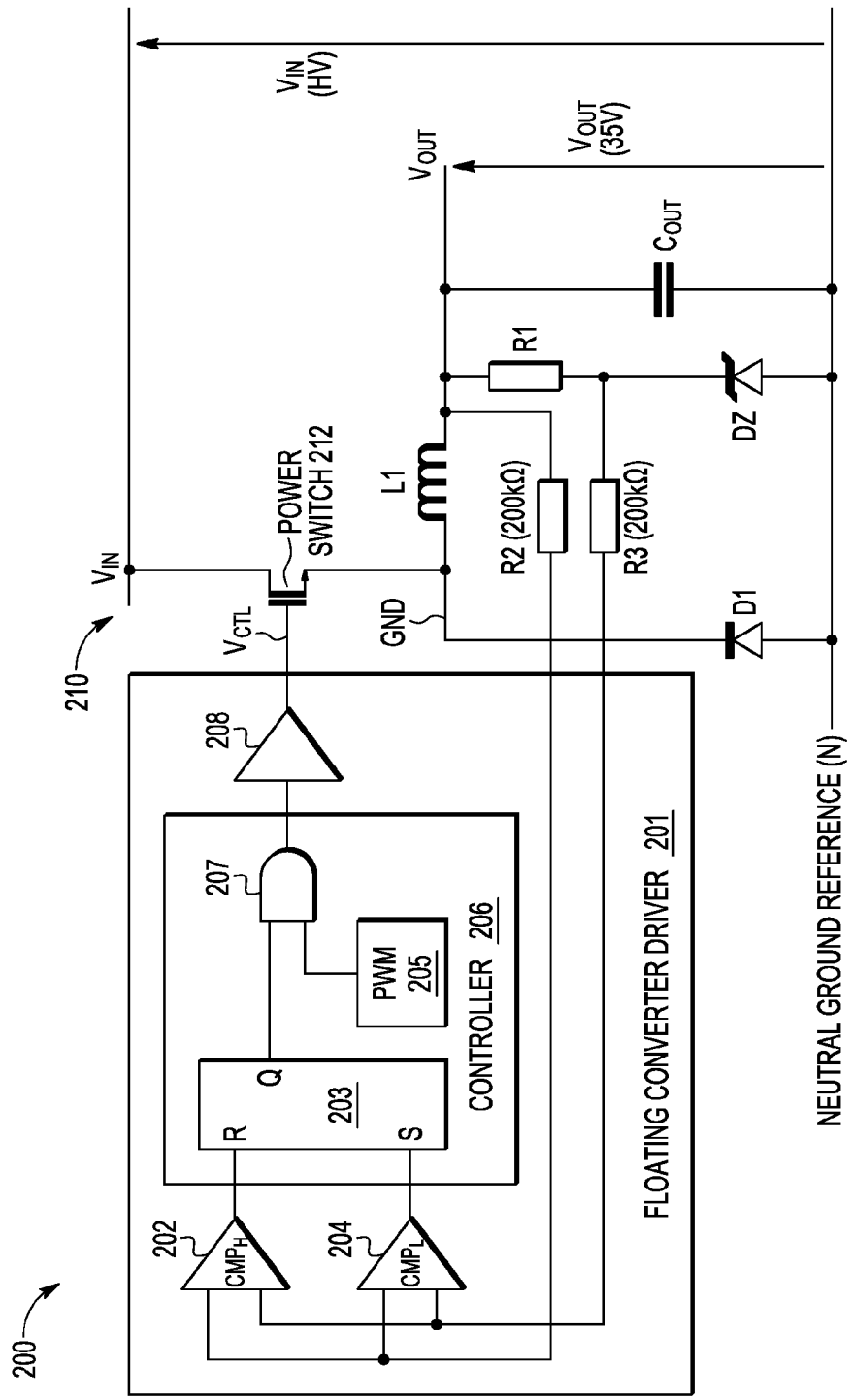
FIG. 2 is a simplified circuit schematic diagram of a non-isolated high voltage DC-DC converter in accordance with selected embodiments of the present disclosure.

FIG. 2 is a simplified circuit schematic diagram of a non-isolated high voltage DC-DC converter 200 which may be implemented as a digitally controlled SMPS having a controller unit 206 and DC/DC converter circuit components 210. In the depicted embodiment, the converter 200 includes a high side comparator driver ($CMP_H$) 202, a low side comparator driver ($CMP_L$) 204, a controller 206 which provides a switch control logic function, a driver buffer 208, a power switch transistor 212 connecting an input voltage $V_{IN}$ to a floating ground node GND at a first end of an inductor L, an output capacitor $C_{OUT}$ connected between a second end of the inductor L at an output voltage node $V_{OUT}$ and a neutral ground reference voltage N, a series-connected resistor R1 and output zener diode $D_Z$ connected between the output voltage node $V_{OUT}$ and the neutral ground reference voltage N, and a freewheeling diode D1 connected across the power switch transistor 212 for recirculating the inductor current flow when the power transistor 212 is switched off. In order to regulate the output voltage, the DC-DC converter 200 also includes a feedback path with a first and second resistive elements R2, R3 connected to opposite ends of the resistor R1 to generate high and low signals (SH, SL) which are fed back as inputs to the high and low side comparator drivers ($CMP_H$, $CMP_L$) 202, 204, where each resistive element R2, R3 has a relatively large resistance value (e.g., over 200 k$\Omega$) as compared to the output resistor R1. As described hereinbelow, the depicted components of the DC-DC converter 200 may be connected to implement a switched mode power supply (SMPS) using a buck-type DC/DC converter constructed with passive filtering components, including an inductor L coupled between a capacitor $C_{OUT}$ and freewheeling diode rectifier D1, though other types of converter circuits (e.g., buck/boost circuits) can be used.

As will be appreciated, the depicted controller 206 may be implemented with a digital signal controller (DSC) or microcontroller unit (MCU) or any other controller to provide many advantages over mixed analog- and processor-controlled implementations. These include programmability, adaptability, reduced component count, design reusability, process independence, advanced calibration ability, and better performance. By using full digital control, the SMPS system becomes flexible and can also realize complex control arithmetic that improves efficiency and lowers cost. A controller-based SMPS system integrates high-performance digital signal processing with power electronics, providing a new method for design of power electronics, and the typical high-level control and communication capability an SMPS system requires. With continued advances in CMOS and VLSI technology, the controller 206 may be implemented as a high-performance, practical, cost-effective, and low-power digital SMPS controller which includes control logic and components, such as a pulse width modulator (PWM) circuit, analog-to-digital converter, digital filter compensator, clock circuit, comparison circuit, communication interface block, general-purpose ADCs (ADCs), digital I/Os, memory, and a processing unit that handles programming, communication, diagnostics, power management, etc. As will be appreciated, the control logic and/or circuit components in the controller 206 are used to provide the requisite controller functionality in response to the feedback control signals described herein. For example, a digital controller 206 may be connected to receive the drive signals from the high and low side comparator drivers 202, 204 at a set-reset latch 203 having an output which is logically combined with the output from a PWM circuit 205 at an AND gate 207 to enable or disable the output from the PWM 205 to the buffer driver 208 for controlling the switching of the power switch transistor 212.

The depicted DC/DC converter circuit components 210 are connected in a buck converter arrangement to convert an input voltage applied at the input supply pin $V_{IN}$ to an output voltage at the supply pin $V_{OUT}$. For many, if not all, applications, it is desirable to maintain the output voltage $V_{OUT}$ at a regulated value over the entire range of $V_{IN}$. To this end, the input voltage $V_{IN}$ is connected a drain electrode of the power switch transistor 212 which is shown as an NMOS transistor having a gate electrode controlled by the controller 206 and power driver 208 and having a source electrode connected to the floating ground node GND, though PMOS switch transistors may be used with the appropriate correction of signal polarities. The power switch transistor 212 is connected at its source electrode to a cathode terminal of the freewheeling diode D1 (e.g., Schottky diode) which has its anode terminal grounded to the neutral ground reference (N). The source electrode of the power switch transistor 212 is also connected across an inductor L to the output node $V_{OUT}$. The inductor L is also connected to one or more additional load capacitors $C_{OUT}$, each of which is grounded at the opposite electrode to the neutral ground reference N. In this way, the output voltage $V_{OUT}$ is developed at a junction connecting the inductor L and the additional load capacitor(s) $C_{OUT}$.

In operation, the controller 206 is operable to generate a buck driving control signal ($V_{CTL}$) from the amplified output of the buffer driver 208 that is applied to the gate electrode of the power switch transistor 212. In selected exemplary embodiments, the controller 206 includes control logic for generating the buck driving signal as an output square wave drive waveform having controlled duty cycles, such as by using a digital pulse width modulator (PWM) that is controlled by the $V_{IN}$ (HV) voltage, the output voltage $V_{OUT}$ and the L inductance through one or more feedback comparators that control the PWM by forcing the inductor current to switch between a maximum inductor current value (e.g., Imax) and a minimum inductor current value (e.g., Imin=0 A). With Imax=1 A, the turn-on time Ton=1*L/($V_{IN}$-$V_{OUT}$), the turn-off time Toff=1*L/($V_{OUT}$+$V_{D1}$), T=Ton+Toff. As duty cycle is Ton/T, duty cycle will move when $V_{IN}$ or $V_{OUT}$ change. Under control of the buck driving control signal $V_{CTL}$, electrical energy from the input voltage $V_{IN}$ is transferred to the load at the output voltage node $V_{OUT}$ by repetitive pulsing provided by the switching of the power switch transistor 212 caused by application of the buck driving signal $V_{CTL}$. Excess energy delivered from the input voltage $V_{IN}$ is stored and unloaded in the reactive components, namely the inductor L and the one or more additional load capacitors $C_{OUT}$. In this way, the converter circuit 200 generates the output voltage $V_{OUT}$ across the series-connected output zener diode $D_Z$ and output resistor R1 which are connected in parallel with the output capacitor $C_{OUT}$ between the converter output $V_{OUT}$ and neutral ground reference (N).

To avoid distortions caused by feeding the output voltage $V_{OUT}$ directly back to the controller 206, the DC-DC converter circuit 200 implements output voltage regulation feedback at the floating converter driver 201 by connecting the first high resistance element R2 to the output voltage node $V_{OUT}$ at one end of the smaller output resistor R1, and connecting the second high resistance element R3 to the other end of the output resistor R1 to generate high and low signals (SH, SL) which are fed back as inputs to the upper and lower comparator drivers ($CMP_H$, $CMP_L$). The relatively large resistance values of the high resistance elements R2, R3 as compared to the output resistor R1 (e.g., R2=R3>>R1) limit the current during high voltage conditions (e.g., during commuting operations). In this configuration, the upper comparator driver $CMP_H$ reads the converter output voltage $V_{OUT}$ during commuting operations of the converter circuit 200 by using the resistive elements R2, R3 to measure the voltage across the output resistor R1 only when the driver ground (GND) is negative relative to the neutral ground reference (N) by a specified voltage (e.g., the voltage drop across the freewheeling diode D1), thereby providing an accurate output feedback voltage that is not affected by the negative driver ground or by interference from the freewheeling diode D1. Otherwise during commuting operations, when the driver ground (GND) is positive relative to the neutral ground reference (N), the floating converter driver 201 increases the converter output voltage $V_{OUT}$ until such time as an upper output voltage threshold is reached, at which point the floating converter driver 201 may stop commuting (e.g., skip cycles), allowing the converter output voltage $V_{OUT}$ to decrease as the output capacitor $C_{OUT}$ is linearly discharged by the load current. While the converter circuit 200 is not commuting, the lower comparator driver $CMP_L$ in the floating converter driver 201 is connected to detect when a lower output voltage threshold is reached, at which point the commuting operations are restarted.

Figure 3:
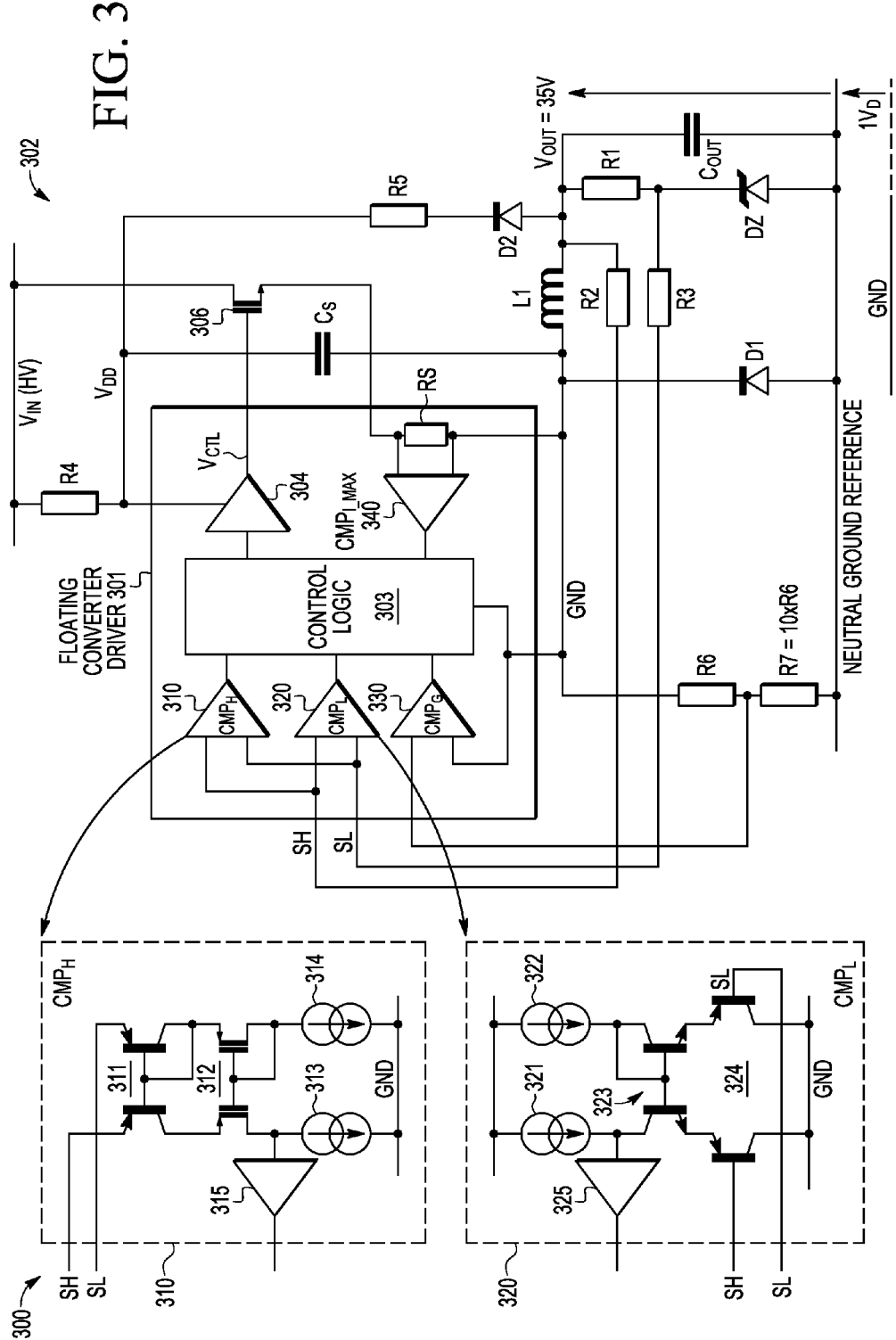
FIG. 3 illustrates circuit schematic details of a non-isolated high voltage DC-DC converter in accordance with selected embodiments of the present disclosure.

To provide additional details for an improved understanding of selected embodiments of the present disclosure, reference is now made to FIG. 3 which illustrates circuit schematic details of a non-isolated high voltage DC-DC converter 300 which may be implemented with a floating converter driver 301 and DC/DC converter circuit components 302 by using a digital pulse width modulator (PWM) that is controlled by the $V_{IN}$ (HV) voltage, the output voltage $V_{OUT}$ and the L inductance through one or more feedback comparators. In the depicted embodiment, the floating converter driver 301 includes a high side comparator driver ($CMP_H$) 310, a low side comparator driver ($CMP_L$) 320, a ground comparator driver 330, a current detector comparator driver 340 which senses a voltage across the shunt resistor Rs for use in detecting a maximum threshold voltage, a control logic block 303 which provides a switch control logic function, and an output buffer driver 304 that adapts the control logic level to the analog gate voltage for the power switch transistor 306. As depicted, the floating converter driver 301 is connected to DC/DC converter circuit components 302, including a first pull-up resistor R4 connecting the voltage supply Vdd at the buffer driver 304 to an input voltage $V_{IN}$, a supply capacitor Cs connected between the voltage supply Vdd provided by the pull-up resistor R4 and a floating ground node GND, a second pull-up resistor R5 connected in series with a diode D2 between the voltage supply Vdd provided by the first pull-up resistor R4 and the output voltage node $V_{OUT}$ for recharging the supply capacitor Cs whenever the supply voltage Vdd is lower than the output voltage $V_{OUT}$, a power switch transistor 306 connecting the input voltage $V_{IN}$ across the shunt resistor Rs to the floating ground node GND at a first end of an inductor L, an output capacitor $C_{OUT}$ connected between a second end of the inductor L at an output voltage node $V_{OUT}$ and the neutral ground reference voltage N, a series-connected resistor R1 and output zener diode $D_Z$ connected between the output voltage node $V_{OUT}$ and the neutral ground reference voltage N, and a freewheeling diode D1 connected to the inductor L for recirculating the inductor current flow when the power transistor 306 is switched off. With the floating converter driver 301 connected between floating ground node GND and the first pull-up resistor R4 having a relative large resistance (e.g., around 200 kΩ), the first pull-up resistor R4 is used to initially pre-charge the supply capacitor Cs when the high voltage input voltage $V_{IN}$ is applied. In similar fashion, the second pull-up resistor R5 is sized with a relative small resistance (e.g., around 10 kΩ) to re-charge the supply capacitor Cs when the supply voltage Vdd drops below the output voltage $V_{OUT}$.

In order to regulate the output voltage, the DC-DC converter 300 also includes a feedback path with a first and second resistive elements R2, R3 connected to opposite ends of the resistor R1 to generate high and low signals (SH, SL) which are fed back as inputs to the high and low side comparator drivers ($CMP_H$, $CMP_L$) 310, 320, where each resistive element R2, R3 has a relatively large resistance value (e.g., over 200 kΩ) as compared to the output resistor R1 (e.g., 10 kΩ). In addition, the DC-DC converter 300 may include pull-down resistors R6 and R7 connected in series between the floating ground node GND and the neutral ground reference voltage N with the common or shared node between the resistors R6, R7 connected as an input to the ground comparator driver 330 which is also connected to receive the floating ground GND as an input. As described hereinbelow, the depicted components of the DC-DC converter 300 may be connected to implement a switched mode power supply (SMPS) using a buck-type DC/DC converter constructed with passive filtering components, including an inductor L coupled between a capacitor $C_{OUT}$ and freewheeling diode rectifier D1, though other types of converter circuits (e.g., buck/boost circuits) can be used.

As will be appreciated, the depicted control logic block 303 may be implemented with hardware or software executed by a DSC, MCU or any other controller that provides programmability, adaptability, reduced component count, design reusability, process independence, advanced calibration ability, and efficient performance. In selected embodiments, the control logic block 303 may be implemented as a high-performance, practical, cost-effective, and low-power digital SMPS controller which includes control logic and components, such as a pulse width modulator (PWM) circuit, analog-to-digital converter, digital filter compensator, clock circuit, comparison circuit, communication interface block, general-purpose ADCs (ADCs), digital I/Os, memory, and a processing unit that handles programming, communication, diagnostics, power management, and other components connected to provide the requisite controller functionality in response to the feedback control signals described herein. For example, a digital control logic block 303 may be configured to receive information in analog form from the different analog comparator drivers 310, 320, 330, 340, convert the received information to digital data, and then process the digital data to regulate the output voltage $V_{OUT}$ generated by the converter 300 by controlling the switching of the power switch transistor 306.

In operation, the control logic block 303 is operable to generate a buck driving control signal ($V_{CTL}$) from the amplified output of the buffer driver 304 that is applied to the gate electrode of the power switch transistor 306 which is illustrated as an NMOS transistor, though a PMOS switch transistor may be used with the appropriate correction of signal polarities. In selected exemplary embodiments, the control logic block 303 includes control logic for generating the buck driving signal a pulse width modulate signal that is enabled or turned ON when the output voltage $V_{OUT}$ reaches a predetermined low output threshold. To generate the PWM signal, the control logic may be configured to turn the power switch transistor 306 OFF when the current detector comparator driver 340 detects that the inductor current $I_L$ reaches the maximum current value, and to turn the power switch transistor 306 ON when the ground comparator driver 330 detects that the inductor current $I_L$ reaches a minimum value (e.g., almost 0 A). In addition, the control logic block 303 may include control logic for disabling or turning OFF the pulse width modulate signal when the output voltage $V_{OUT}$ reaches a predetermined high output threshold.

To avoid distortions caused by feeding the output voltage $V_{OUT}$, the DC-DC converter circuit 300 implements output voltage regulation feedback by connecting the first and second relatively high resistance elements R2, R3 (e.g., over 200 kΩ) across the output resistor R1 (e.g., R1=10 kΩ) to generate high and low signals (SH, SL) which are fed back as inputs to the upper and lower comparator drivers 310, 320 at the floating converter driver 301. In selected embodiments, the comparator drivers 310, 320 may each be implemented with floating differential comparators which are "floating" in the sense that each differential comparator is connected with the ground (GND) that is floating with respect to the DC-DC converter neutral ground reference (N). The relatively large resistance values of the high resistance elements R2, R3 as compared to the output resistor R1 limit the current during high voltage conditions (e.g., during commuting operations). During commuting operations of the converter circuit 300, the upper comparator driver 310 reads the converter output voltage $V_{OUT}$ by using the resistive elements R2, R3 to measure the voltage across the output resistor R1 only when the driver ground (GND) is negative relative to the neutral ground reference (N) by a specified voltage (e.g., the voltage drop across the freewheeling diode D1), thereby providing an accurate output feedback voltage that is not affected by the negative driver ground or by interference from the freewheeling diode D1.

To detect when the driver ground (GND) is negative relative to the neutral ground reference (N), the ground comparator driver 330 is connected to receive inputs from the common or shared node between the resistors R6, R7 and the driver ground GND. When the NMOS power switch transistor 306 is turned OFF, inductive current from the inductor L flows into the freewheeling diode D1, driving the driver ground GND to be lower than the neutral ground reference N. However, as the inductive current decreases to 0 A, the driver ground GND is less and less negative. When the driver ground (GND) is close to the neutral ground reference (N) (e.g., within about 20 mV), this detected by the ground comparator driver 330 which prompts the control logic block 303 to turn the NMOS power switch transistor 306 ON again.

The control logic block 303 is also connected to receive an input from the current detector comparator driver 340 which senses a voltage across the shunt resistor Rs for use in turning the NMOS power switch transistor 306 OFF. The current detector comparator driver 340 is connected to sense the voltage across the shunt resistor Rs. When the voltage threshold is reached (Vth), the detected threshold current Ith=Vth/Rs. During commutation operations when the NMOS power switch transistor 306 is turned ON, the detected current goes up linearly until reaching the maximum level when the current detector comparator driver 340 prompts the control logic block 303 to turn the NMOS power switch transistor 306 OFF.

To enable accurate feedback of the output voltage during commuting operations, the upper comparator driver 310 may be implemented with cascoded mirror circuits 311-315 which are connected across the pair of relatively large resistive elements R2, R3 to force a 1V differential across the output resistor R1, thereby providing an accurate output feedback voltage that is not affected by the negative driver ground or by interference from the freewheeling diode. In an example embodiment, the upper comparator driver 310 includes a PNP mirror circuit 311 for connecting the received high and low signals (SH, SL), respectively, across a PMOS mirror circuit 312 to first and second current sources 313, 314 to thereby drive the output buffer circuit 315. With the current sources 313, 314 connected to the output ground GND, the upper comparator driver 310 only works when the output ground GND is negative (e.g., lower than the neutral ground reference N).

Figure 4:
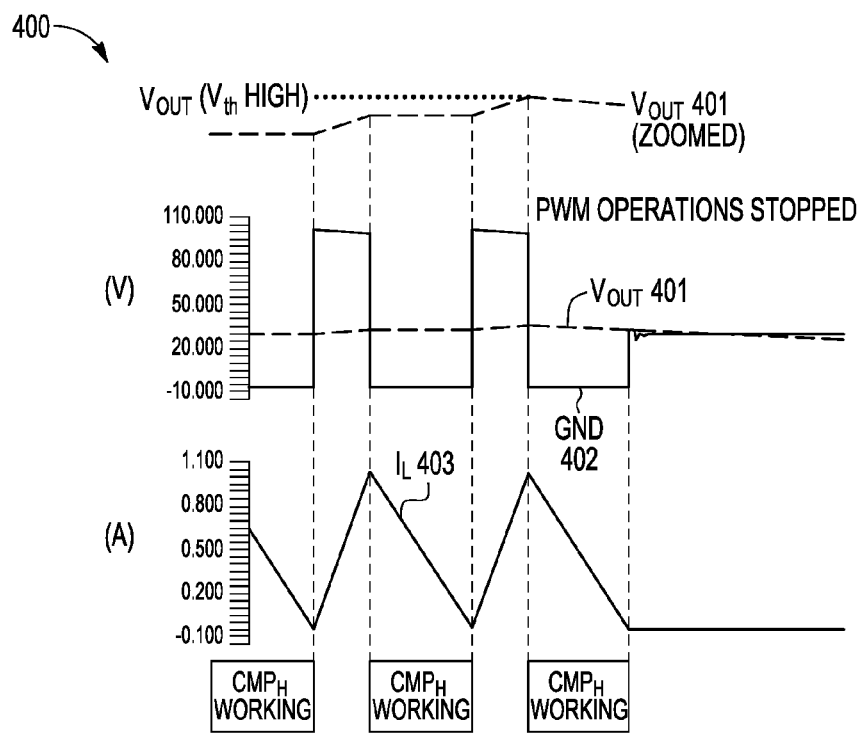
FIG. 4 is a timing diagram of the DC-DC converter output voltage signal generated in response to the feedback voltage signal until an upper output voltage threshold is detected.

This is illustrated in FIG. 4 with the timing diagram 400 which shows the output voltage signal $V_{OUT}$ 401 generated by the DC-DC converter in response to the GND voltage 402 and inductor current 403 signals as the upper comparator driver 310 works to measure the output feedback voltage during PWM operations until detecting the upper output voltage threshold (Vth HIGH), at which time PWM operations are stopped. When the driver ground (GND) is negative (e.g., GND=−Vd=−1.0V), the upper comparator driver 310 forces a first current source 313 (e.g., 10 uA) in the high signal SH and forces a second a current source 314 (e.g., 5 uA) in the low signal SL, thereby drawing the differential current amounts through the large resistive elements R2, R3 (e.g., 200 kΩ) which are attached to the converter output $V_{OUT}$ to define a one volt differential drop across the resistor R1. With the cascoded mirror circuits 311-315, the upper comparator driver 310 is able to sustain the output voltage $V_{OUT}$. Since the upper comparator driver 310 is floating when measuring the one volt threshold across the 10 kΩ resistor R1 that is connected in series with the Zener diode $D_Z$, the output feedback voltage is exact and not affected by the driver ground GND being pulled to −1 Vd.

Otherwise during commuting operations, when the driver ground (GND) is positive relative to the neutral ground reference (N), the floating converter driver 301 increases the converter output voltage $V_{OUT}$ until such time as an upper output voltage threshold is reached, at which point the floating converter driver 301 may stop commuting (e.g., skip cycles), allowing the converter output voltage $V_{OUT}$ to decrease as the output capacitor $C_{OUT}$ is linearly discharged by the load current. For example, when the one volt threshold is applied across the 10 kΩ output resistor R1, this forces 100 uA in the series-connected Zener diode $D_Z$ to reach the maximum output voltage, at which point the upper comparator driver 310 stops the PWM operation, as shown in FIG. 4 with the enlarged view of the output voltage $V_{OUT}$ reaching the high output voltage threshold (Vth HIGH) to stop the PWM operation.

While the converter circuit 300 is not commuting, the lower comparator driver 320 in the floating converter driver 301 is connected to detect when a lower output voltage threshold (Vth LOW) is reached, at which point the commuting operations are restarted. To this end, the lower comparator driver 320 may be implemented with cascoded mirror circuits 321-325 which are connected across the pair of relatively large resistive elements R2, R3 to receive the high and low signals (SH, SL) from each end of the output resistor R1. In an example embodiment, the lower comparator driver 320 includes first and second current sources 321, 322 which are connected across a first PNP mirror circuit 323 to a second PMOS circuit 324 which is connected to receive the high and low signals (SH, SL) to thereby drive the output buffer circuit 325. When the floating converter driver 301 does not commute, the output voltage $V_{OUT}$ discharges to the driver ground (GND) because there is no voltage across the inductor L, and the lower comparator driver 320, which is connected to receive the high and low signals (SH, SL) across the resistive elements R2, R3, is connected to detect when the when the voltage across the 10 kΩ output resistor R1 is close to 20 mV.

Figure 5:
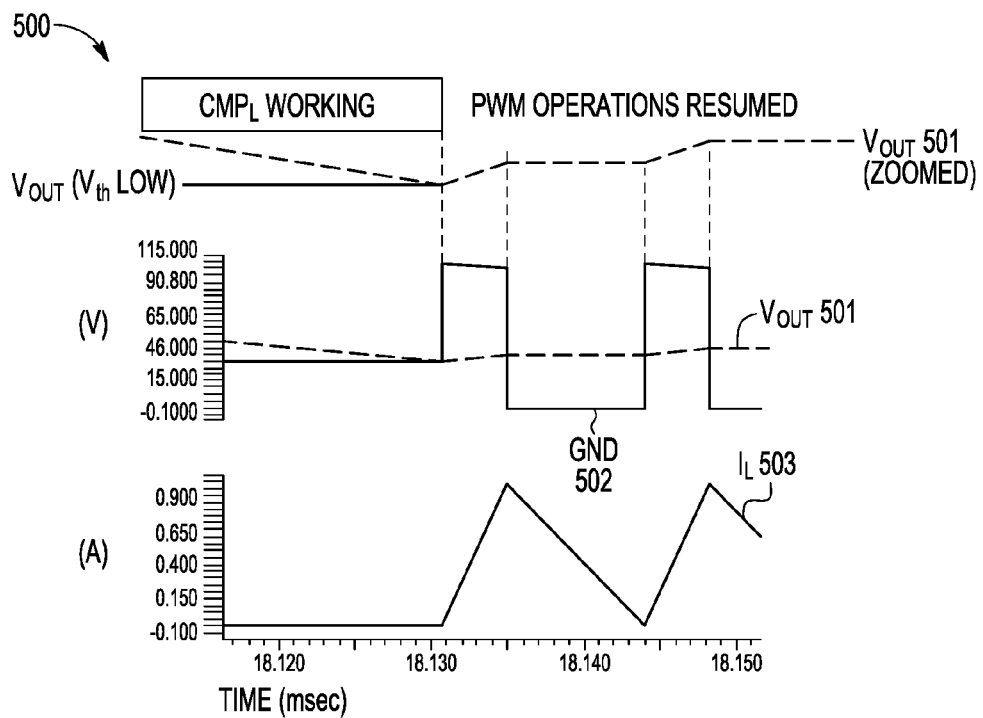
FIG. 5 is a timing diagram of the DC-DC converter output voltage signal voltage generated in response to the feedback voltage signal when a lower output voltage threshold is detected.

This is illustrated in FIG. 5 with the timing diagram 500 which shows the output voltage signal $V_{OUT}$ 501 generated by the DC-DC converter in response to the GND voltage 502 and inductor current 503 signals as the lower comparator driver 320 works to detect the lower output voltage threshold (Vth LOW) before resuming the PWM operations. As the output capacitor $C_{OUT}$ is discharged by the current consumption of the load connected to the converter output, the current flowing in the Zener diode $D_Z$ decreases because the voltage across the 10 kΩ output resistor R1 goes down. When the voltage across 10 kΩ output resistor R1 is close to 20 mV, the lower comparator driver 320 turns the PWM operation back ON again. As seen from the foregoing, the output hysteresis is the voltage across the 10 kΩ which is around 1V.

Figure 6:
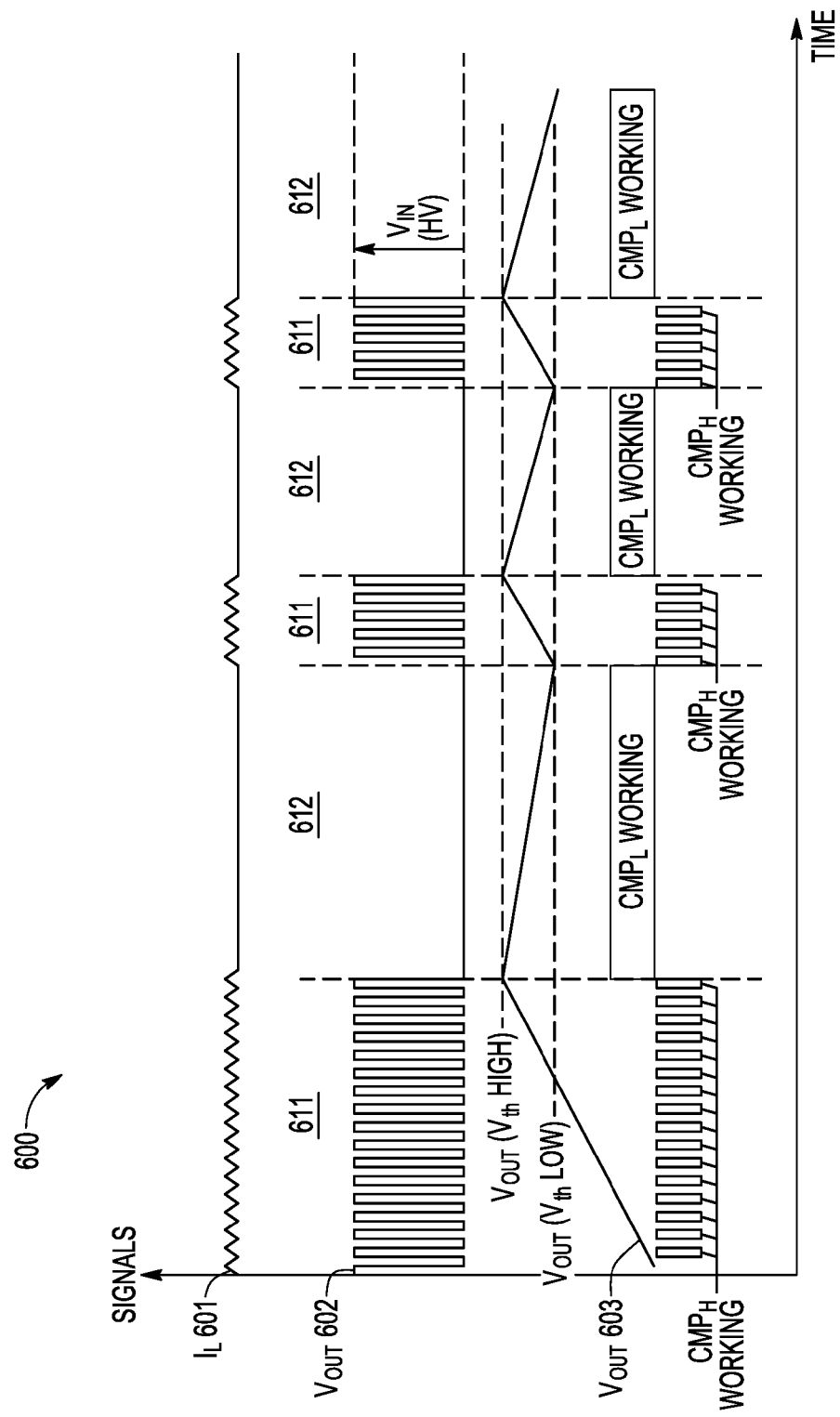
FIG. 6 is a timing diagram illustration of the interaction of the comparator driver inputs to the control logic during operation of the non-isolated high voltage DC-DC converter in accordance with selected embodiments of the present disclosure.

To illustrate the operation of the non-isolated high voltage DC-DC converter 300 shown in FIG. 3, reference is now made to FIG. 6 which depicts a timing diagram illustration 600 of the combined interaction of the comparator drivers 310, 320, 330, 340 and the control logic block 303 in accordance with selected embodiments of the present disclosure. During commuting operations 611, the inductor coil current $I_L$ 601 linearly increases and decreases in response to the PWM operations of the control logic 303 which turn the power switch transistor 306 ON and OFF in response to the cycling floating ground voltage $V_{GND}$ 602 so that the resulting output voltage $V_{OUT}$ 603 is ramped up during each "high" state of the PWM output signal from the control logic 303. To control ramp up operations, the ground comparator driver 330 is connected to detect when the inductor current $I_L$ reaches almost zero current, thereby prompting the control logic 303 to turn ON the NMOS power switch transistor 306. As the resulting inductor current $I_L$ 601 increases, the current detector comparator driver 340 is connected with the shunt resistor Rs to detect when the inductor current $I_L$ reaches the maximum current, thereby prompting the control logic 303 to turn OFF the NMOS power switch transistor 306. During the resulting "low" state of the PWM output signal when the floating ground voltage GND is 1 Vd lower than the neutral ground reference voltage N, the high side comparator driver ($CMP_H$) 310 is operative to read the output voltage information fed back across the first and second resistive elements R2, R3 in order to detect when the output voltage $V_{OUT}$ reaches the high output voltage threshold (Vth HIGH). When the output voltage $V_{OUT}$ 603 reaches the high output voltage threshold (Vth HIGH), the high side comparator driver 310 turns OFF the PWM operation, as indicated at regions 612. For example, the output from the high side comparator driver 310 indicating that the high output voltage threshold is reached can be used to reset an RS latch functionality in the control logic 303.

When commuting operations are stopped or suspended 612, the output voltage $V_{OUT}$ 603 stored at the output capacitor $C_{OUT}$ is discharged by the load current in a linear fashion until reaching a low output voltage threshold (Vth LOW) which is detected. To this end, the low side comparator driver ($CMP_L$) 320 is operatively connected to read the output voltage information fed back across the first and second resistive elements R2, R3 in order to detect when the output voltage $V_{OUT}$ reaches the low output voltage threshold (Vth LOW). When the low output voltage threshold is reached, the low side comparator driver 320 turns ON the PWM operation, as indicated at regions 611. For example, the output from the low side comparator driver 320 indicating that the low output voltage threshold is reached can be used to set an RS latch functionality in the control logic 303.

Figure 7:
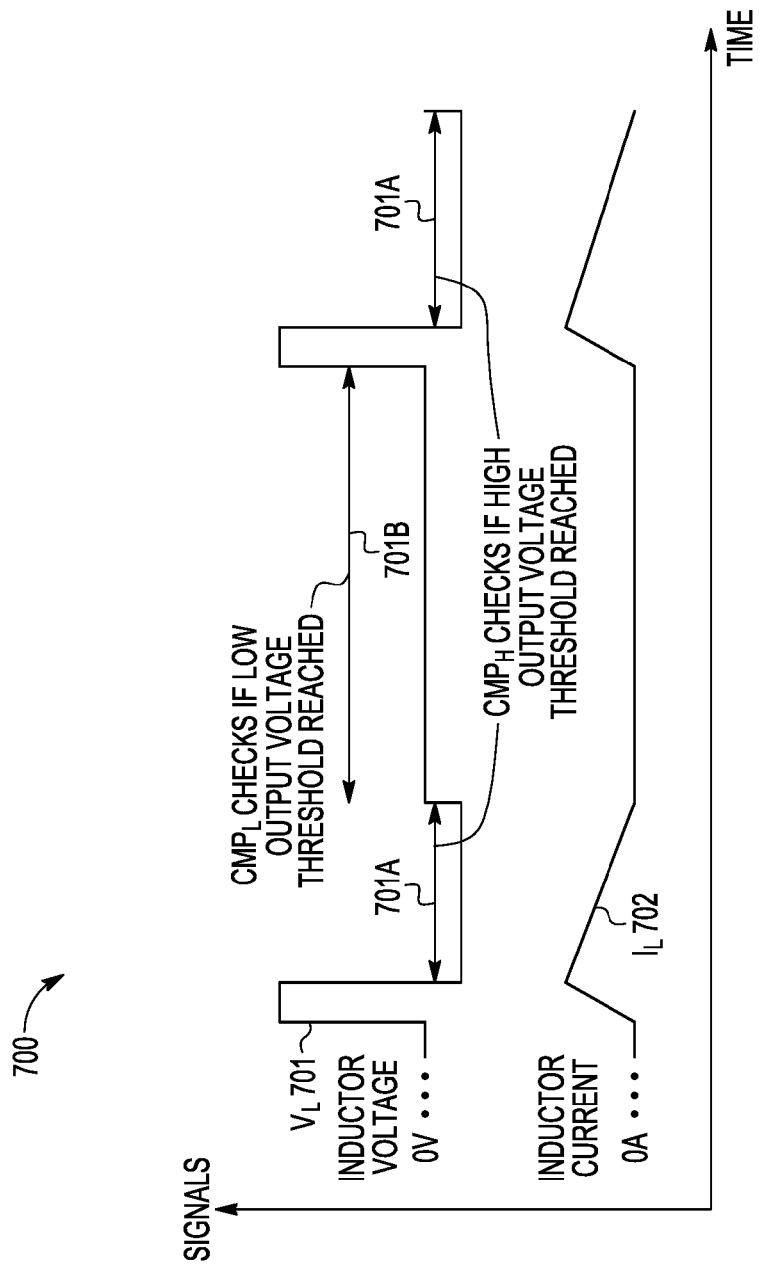
FIG. 7 illustrates a discontinuous skip mode during which high and low output threshold voltages are checked during inductor charging and discharging.

To provide additional details for an improved understanding of selected embodiments of the present disclosure, reference is now made to FIG. 7 which illustrates a timing diagram 770 of a discontinuous skip mode during which high and low output threshold voltages are checked during inductor charging and discharging to improve efficiency during light load applications. To implement a skip mode, the control logic block 303 may be configured to allow the regulator to skip cycles when they are not needed, thereby improving efficiency at light loads. With reference to the DC-DC converter 300 shown in FIG. 3, the control logic block 303 may include control logic for generating the buck driving signal which does not initiate a new cycle when not needed, thereby allowing the inductor current 702 to discharge to zero. At this point, the rectifying freewheeling diode D1 blocks any reverse-inductor current flow and the inductor voltage 701 goes to zero. In this "discontinuous mode" shown in FIG. 7, a new cycle is initiated when the output voltage $V_{OUT}$ drops below the regulating threshold. To this end, the high side comparator driver ($CMP_H$) 310 is connected during each "low" state of the PWM output signal 701A (e.g., when the inductor current $I_L$ has a negative slope) to check if the output voltage $V_{OUT}$ has reached the high output voltage threshold (Vth HIGH). Once the high threshold output voltage is reached, the PWM cycling operations are suspended or stopped 701B, allowing the output voltage $V_{OUT}$ to decay until the low side comparator driver (CMP$_L$) 320 detects that the output voltage $V_{OUT}$ has reached the low output voltage threshold (Vth LOW), at which point PWM cycling operations are resumed or restarted.

Figure 8:
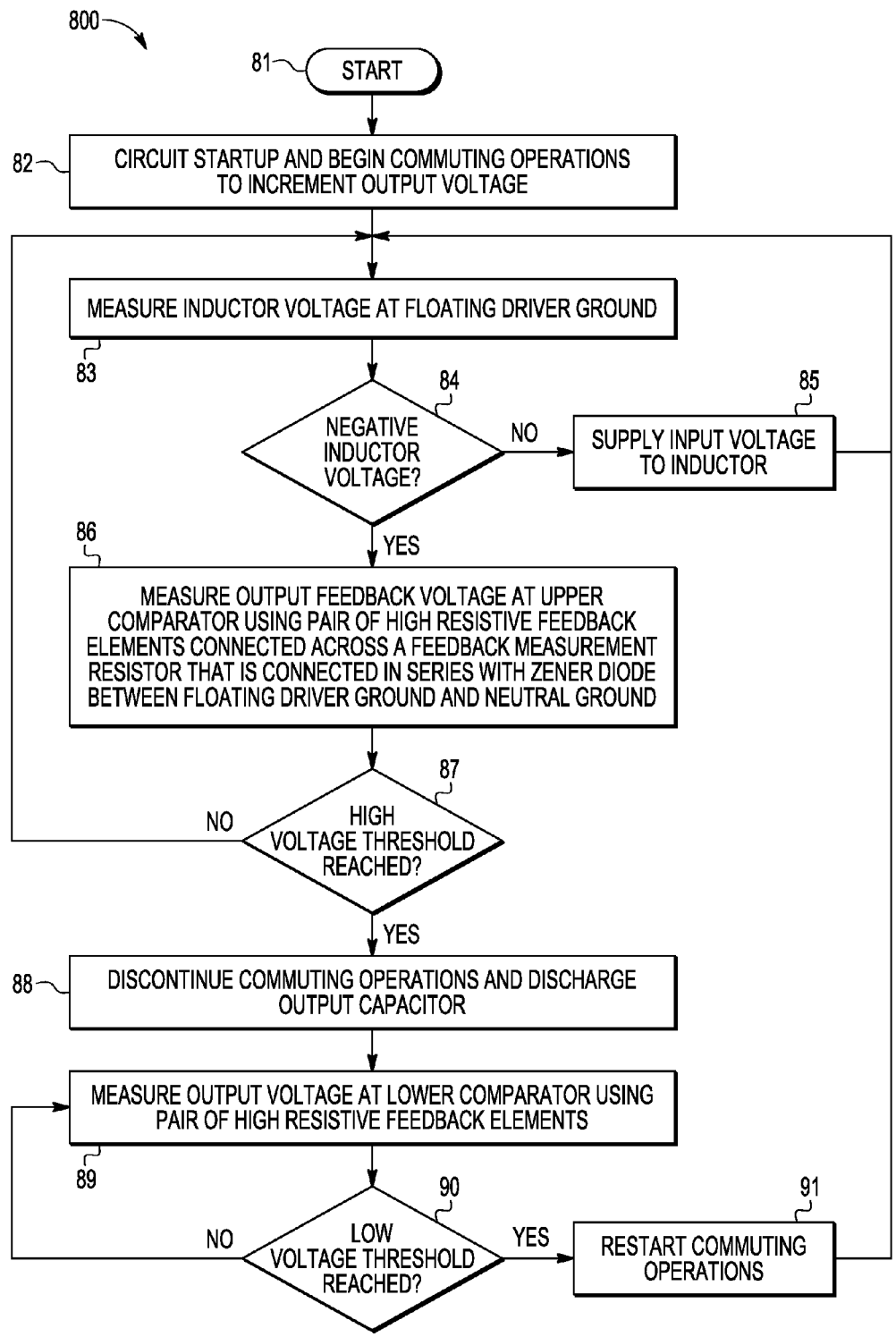
FIG. 8 schematically shows a flow chart of a method of operating a non-isolated high voltage DC-DC converter in accordance with selected embodiments of the present disclosure.

Turning now to FIG. 8, there is illustrated a simplified flow chart sequence 800 of a method of operating a non-isolated high voltage DC-DC converter in accordance with selected embodiments of the present disclosure. After the method starts at step 81, the converter startup sequence is initiated at step 82 to begin commuting operations in which PWM cycles are used to generate the output voltage from the converter. During the commuting operations, the inductive coil current is monitored by a current detector comparator driver to turn the power switch transistor OFF when a maximum current is reached, and is monitored by a ground comparator driver to turn the power switch transistor ON when the minimum inductive current (e.g., approximately 0 A) is reached. At step 83, the inductor voltage at the floating ground node GND of the floating driver circuit is measured or compared to a neutral ground voltage during the commuting operations. For example, the inductor voltage measurement may be performed by a ground comparator driver which is connected to receive inputs from a floating ground node GND and the shared node of a pair of pull-down resistors which connect the floating ground node GND to the neutral ground voltage.

If the measured inductor voltage is positive during commuting operations (negative outcome to detection step 84), then the input voltage is supplied to charge the inductor by switching ON the power switch transistor at step 85. However, if the measured inductor voltage is negative (affirmative outcome to detection step 84), then an upper comparator measures the output feedback voltage at step 86 using a pair of high resistive feedback elements which are connected across a feedback measurement resistor R1 that is connected in series with a Zener diode D$_Z$ between the output voltage node $V_{OUT}$ and neutral ground. Since the exact output voltage value $V_{OUT}$ will be given by the combined voltage across the series-connected feedback measurement resistor (e.g., VR1=10 kΩ) and the Zener diode (e.g., V$_Z$), the pair of high resistive feedback elements R2, R3 may be resistive elements having a resistance of at least 200 kΩ that are connected across the feedback measurement resistor R1 for use in feeding back the output feedback voltage VR1 to the driver when the floating driver ground GND is at −Vd, thereby limiting current during high voltage operations.

If the measured output feedback voltage does not reach a high voltage threshold (negative outcome to detection step 87), then the commuting operations continue by returning back to the inductor voltage measurement step 83. However, if the measured output feedback voltage reaches the high voltage threshold (affirmative outcome to detection step 87), then commuting operations are discontinued at step 88 so that the output capacitor can be discharged. The detection of the high voltage threshold at step 87 can be achieved by appropriately sizing the resistance values of the feedback measurement resistor R1 (e.g., 10 kΩ) and the resistive elements R2, R3 (e.g., 200 kΩ) so that the current sources in the upper comparator differentially develop a predetermined differential across the feedback measurement resistor R1 (e.g., VR1=1V) which, upon detection at the upper comparator, signals to the control logic that the high voltage threshold for the output voltage is reached. For example, the upper comparator may force 5 uA and 10 uA currents through the resistive elements R2, R3, respectively, to develop a 1V differential across the 10 kΩ feedback measurement resistor R1, thereby forcing 100 uA in the Zener diode D$_Z$ which corresponds to the high voltage threshold for the output voltage, thereby stopping PWM cycles at step 88

While the commuting operations are stopped and the output voltage discharges from the output capacitor, the lower comparator measures the output feedback voltage at step 89 using the same pair of high resistive feedback elements. To this end, the lower comparator may also be connected across the same high resistive feedback elements R2, R3 to the feedback measurement resistor R1, which in turn is connected in series with a Zener diode D$_Z$ between the output voltage node $V_{OUT}$ and neutral ground. In this mode, the current flowing in the Zener diode D$_Z$ decreases as the voltage across the feedback measurement resistor R1 decreases toward zero, eventually reaching a low voltage threshold (e.g., VR1=20 mV).

For so long as the measured output feedback voltage does not reach the predetermined low voltage threshold (negative outcome to detection step 90), the lower comparator continues to measure the output voltage at step 89. However, when the measured output feedback voltage reaches the low voltage threshold (affirmative outcome to detection step 90), the lower comparator prompts the control logic to turn ON the PWM cycles, thereby restarting the commuting operations at step 91. Since the exact output voltage value $V_{OUT}$ will be given by the combined voltage across the series-connected feedback measurement resistor (e.g., VR1=10 kΩ) and the Zener diode (e.g., V$_Z$), the pair of high resistive feedback elements R2, R3 may be resistive elements having a resistance of at least 200 kΩ that are connected across the feedback measurement resistor R1 for use in feeding back the output feedback voltage VR1 to the driver when the floating driver ground GND is at −Vd, thereby limiting current during high voltage operations.

By now it should be appreciated that there is provided herein a method and apparatus for regulating a non-isolated DC-DC converter, such as a high voltage DC-DC converter. In the disclosed methodology and apparatus, a pulse width modulated signal (PWM) is applied to cyclically activate a power transistor that couples a high voltage input voltage to a floating ground voltage node, thereby charging an inductor with a floating ground voltage signal at the floating ground voltage node to generate an output voltage at an output of the high voltage DC-DC converter. In selected embodiments, the PWM is applied by turning OFF the power transistor upon detecting a maximum threshold inductive current when measuring inductive current in the inductor with a floating comparator that has first and second inputs connected across a shunt resistor that is connected between the power transistor and the floating ground node, and then turning ON the power transistor upon detecting a minimum threshold inductive current when measuring inductive current in the inductor with a floating comparator that has first and second inputs connected across a pull-down resistor that is connected between the floating ground voltage node and the neutral ground reference voltage. In addition or in the alternative, the application of the PWM signal may include setting a latch input to an AND gate which enables the pulse width modulated signal to be supplied to a gate electrode of the power transistor. As the PWM signal is applied the output voltage is measured with a first floating comparator to detect a high threshold output voltage at the output voltage, where the first floating comparator has first and second inputs connected, respectively, across first and second resistive elements to measure a feedback voltage across a feedback resistor that is connected in series with a first diode between the output voltage and a neutral ground reference voltage. In selected embodiments, the first floating comparator may measure the output voltage by periodically measuring the output voltage when the floating ground voltage signal is negative in relation to the neutral ground reference voltage. In selected embodiments, the resistance values for the first and second resistive elements and the feedback resistor are sized to develop a first predetermined voltage across the feedback resistor when the first floating comparator detects the high threshold output voltage at the output voltage. Upon detecting the high threshold output voltage, the pulse width modulated signal is disabled to deactivate the power transistor, and then the output voltage is measured with a second floating comparator to detect a low threshold output voltage at the output voltage, where the second floating comparator has first and second inputs connected, respectively, across the first and second resistive elements to measure the feedback voltage across the feedback resistor. In selected embodiments, the resistance values for the first and second resistive elements and the feedback resistor are sized to develop a second predetermined voltage across the feedback resistor when the second floating comparator detects the low threshold output voltage at the output voltage. Upon detecting the low threshold output voltage, the pulse width modulated signal is enabled to cyclically reactivate the power transistor.

In another form, there is provided a non-isolated high voltage DC-DC converter and associated method of operation for regulating the output voltage. In the disclosed DC-DC converter, a power transistor is connected to couple a high voltage input voltage to a floating ground voltage node in response to a switching control gate signal, thereby charging an inductor with the floating ground voltage node to generate an output voltage at a converter output. In addition, a feedback circuit is connected to measure a threshold output voltage at one or more floating comparators, and includes first and second relatively large resistive elements connected to measure a feedback voltage across a relatively small feedback resistor that is connected in series with a first diode between the converter output and a neutral ground reference voltage. The disclosed DC-DC converter also includes a floating converter driver connected to supply the switching control gate signal to the power transistor by enabling the switching control gate signal upon detecting a low threshold output voltage and by disabling the switching control gate signal upon detecting a high threshold output voltage. Connected to or in the floating converter driver, a first floating comparator has first and second inputs connected, respectively, across the first and second relatively large resistive elements to detect the high threshold output voltage. In operation, the first floating comparator is connected to periodically measure the output voltage when the floating ground voltage signal is negative in relation to the neutral ground reference voltage. In addition, a second floating comparator having first and second inputs is connected, respectively, across the first and second relatively large resistive elements to detect the low threshold output voltage. In selected embodiments, the floating converter driver generates the switching control gate signal from an AND gate connected to receive a pulse width modulated signal and an output from a set/reset latch having set and reset input connected, respectively, to output from the first and second floating comparators. In addition to the first and second floating comparators, the DC-DC converter may include a third floating comparator that is connected to detect a maximum threshold inductive current with first and second inputs connected across a shunt resistor that is connected between the power transistor and the floating ground voltage node. In addition, a fourth floating comparator may be connected to detect a minimum threshold inductive current with first and second inputs connected across a pull-down resistor that is connected between the floating ground voltage node and the neutral ground reference voltage. In selected embodiments, the resistance values for the first and second relatively large resistive elements (e.g., approximately 200 k$\Omega$) and the relatively small feedback resistor (e.g., approximately 10 k$\Omega$) are sized to develop a first predetermined voltage across the feedback resistor when the first floating comparator detects the high threshold output voltage at the output voltage, and to develop a second predetermined voltage across the relatively small feedback resistor when the second floating comparator detects the low threshold output voltage.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a buck-type DC-DC voltage converter control method and apparatus without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention.

Although the described exemplary embodiments disclosed herein are directed to a method and apparatus in which a DC-DC converter output feedback voltage is measured by a floating driver connected across a pair of high resistance elements to a feedback measurement resistor that is connected in series with a Zener diode between the output voltage node and neutral ground reference to feed back an exact measure of the output voltage, the present invention is not necessarily limited to the example embodiments which illustrate inventive aspects of the present invention that are applicable to a wide variety of applications. Thus, the particular embodiments disclosed above are illustrative only and should not be taken as limitations upon the present invention, as the invention may be modified and practiced in different but equivalent manners apparent to those skilled in the art having the benefit of the teachings herein. For example, a floating driver circuit as described herein may be used to control a gate current at a power switch transistor, though because the floating driver circuit for implementing the present disclosure may be composed of electronic components and circuits known to those skilled in the art, circuit details have not been explained in any greater extent than that considered necessary, for the understanding and appreciation of the underlying concepts of the present invention and in order not to obfuscate or distract from the teachings of the present disclosure. In addition, the connections between electrically coupled devices may be any type of connection suitable to transfer signals from or to the respective nodes, units or devices, for example via intermediate devices. Moreover, the functionality embodied in the floating converter driver may be combined or re-ordered in a single software or hardware based circuit to achieve the overall output feedback voltage measurement outcome. In addition, the process steps may be performed in an alternative order than what is presented. Furthermore, those skilled in the art will recognize that boundaries between the functionality of the above described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

As disclosed herein, the DC-DC converter floating converter drive may employ a computer product, computing device, system, method, and apparatus which includes or uses computer program code executable on one or more central processing units or other processing devices to observe the output feedback voltage across the high resistive elements without distortion or interference from the freewheeling rectifier diode to thereby control the activation and deactivation of PWM operations upon detecting high and low voltage thresholds at the output feedback voltage. As such, the DC-DC converter floating converter drive may be implemented by way of executable program code stored within a non-transitory computer program. As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROMs) or random-access memories (RAMs)) are nevertheless to be viewed here as being "non-transitory" whereas a signal carrier in transit is to be considered "transitory" notwithstanding that the signal may remain in transit for a lengthy period of time.). In other embodiments, the IGBT gate control may be implemented by microcontroller, microprocessor, advanced RISC machine (ARM) processor, field-programmable gate array (FPGA) and/or ad-hoc hardware (e.g., dedicated silicon solutions) in which the IGBT gate control algorithms are advantageously embodied for more efficient processing and improved computational performance.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method of regulating a non-isolated DC-DC converter, comprising:
    applying a pulse width modulated signal to cyclically activate a power transistor that couples an input voltage to a floating ground voltage node, thereby charging an inductor with a floating ground voltage signal at the floating ground voltage node to generate an output voltage at an output of the DC-DC converter;
    measuring the output voltage with a first floating comparator to detect a high threshold output voltage at the output voltage, where the first floating comparator has first and second inputs connected, respectively, across first and second resistive elements to measure a feedback voltage across a feedback resistor that is connected in series with a first diode between the output voltage and a neutral ground reference voltage;
    disabling the pulse width modulated signal to deactivate the power transistor upon detecting the high threshold output voltage;
    measuring the output voltage with a second floating comparator to detect a low threshold output voltage at the output voltage, where the second floating comparator has first and second inputs connected, respectively, across the first and second resistive elements to measure the feedback voltage across the feedback resistor; and
    enabling the pulse width modulated signal to cyclically reactivate the power transistor upon detecting the low threshold output voltage.

2. The method of claim 1, where applying the pulse width modulated signal comprises:
    measuring inductive current in the inductor with a third floating comparator to detect a maximum threshold inductive current, where the third floating comparator has first and second inputs connected across a shunt resistor that is connected between the power transistor and the floating ground voltage node; and
    turning OFF the power transistor upon detecting the maximum threshold inductive current.

3. The method of claim 2, where applying the pulse width modulated signal comprises:
    measuring inductive current in the inductor with a fourth floating comparator to detect a minimum threshold inductive current, where the fourth floating comparator has first and second inputs connected across a pull-down resistor that is connected between the floating ground voltage node and the neutral ground reference voltage; and turning ON the power transistor upon detecting the minimum threshold inductive current.

4. The method of claim 1, where applying the pulse width modulated signal comprises setting a latch input to an AND gate which enables the pulse width modulated signal to be supplied to a gate electrode of the power transistor.

5. The method of claim 1, where measuring the output voltage with the first floating comparator comprises periodically measuring the output voltage with the first floating comparator when the floating ground voltage signal is negative in relation to the neutral ground reference voltage.

6. The method of claim 1, where resistance values for the first and second resistive elements and the feedback resistor are sized to develop a first predetermined voltage across the feedback resistor when the first floating comparator detects the high threshold output voltage at the output voltage.

7. The method of claim 6, where resistance values for the first and second resistive elements and the feedback resistor are sized to develop a second predetermined voltage across the feedback resistor when the second floating comparator detects the low threshold output voltage at the output voltage.

8. A non-isolated DC-DC converter comprising:
a power transistor connected to couple an input voltage to a floating ground voltage node in response to a switching control gate signal, thereby charging an inductor with the floating ground voltage node to generate an output voltage at a converter output;
a feedback circuit for measuring a threshold output voltage at one or more floating comparators, the feedback circuit comprising first and second resistive elements connected to measure a feedback voltage across a feedback resistor that is connected in series with a first diode between the converter output and a neutral ground reference voltage, where the first and second resistive elements have a resistance that is larger than a resistance of the feedback resistor; and
a floating converter driver connected to supply the switching control gate signal to the power transistor by enabling the switching control gate signal upon detecting a low threshold output voltage and by disabling the switching control gate signal upon detecting a high threshold output voltage.

9. The non-isolated DC-DC converter of claim 8, where the one or more floating comparators comprises:

a first floating comparator having first and second inputs connected, respectively, across the first and second resistive elements to detect the high threshold output voltage; and
a second floating comparator having first and second inputs connected, respectively, across the first and second resistive elements to detect the low threshold output voltage.

10. The non-isolated DC-DC converter of claim 9, further comprising:
a third floating comparator connected to detect a maximum threshold inductive current with first and second inputs connected across a shunt resistor that is connected between the power transistor and the floating ground voltage node; and
a fourth floating comparator connected to detect a minimum threshold inductive current with first and second inputs connected across a pull-down resistor that is connected between the floating ground voltage node and the neutral ground reference voltage.

11. The non-isolated DC-DC converter of claim 9, where the floating converter driver generates the switching control gate signal from an AND gate connected to receive a pulse width modulated signal and an output from a set/reset latch having set and reset input connected, respectively, to output from the first and second floating comparators.

12. The non-isolated DC-DC converter of claim 9, where the first floating comparator is connected to periodically measure the output voltage when the floating ground voltage signal is negative in relation to the neutral ground reference voltage.

13. The non-isolated DC-DC converter of claim 8, where each of the first and second resistive elements has a resistance that is approximately 20 times a resistance of the feedback resistor.

14. The non-isolated DC-DC converter of claim 8, where resistance values for the first and second resistive elements and the feedback resistor are sized to develop a first predetermined voltage across the feedback resistor when the first floating comparator detects the high threshold output voltage.

15. The non-isolated DC-DC converter of claim 14, where resistance values for the first and second resistive elements and the feedback resistor are sized to develop a second predetermined voltage across the feedback resistor when the second floating comparator detects the low threshold output voltage.

* * * * *